United States Patent [19]

Hickox

[11] Patent Number: 4,766,655
[45] Date of Patent: Aug. 30, 1988

[54] METHOD FOR FABRICATING A COMPENSATED SILICON PRESSURE SENSING DEVICE

[75] Inventor: Robert E. Hickox, Tucson, Ariz.

[73] Assignee: Burr-Brown Corporation, Tucson, Ariz.

[21] Appl. No.: 922,770

[22] Filed: Oct. 24, 1986

Related U.S. Application Data

[62] Division of Ser. No. 666,372, Oct. 30, 1984, Pat. No. 4,672,853.

[51] Int. Cl.$^4$ .............................................. H01L 41/22
[52] U.S. Cl. ..................................... 29/25.35; 29/620; 29/621.1; 73/708; 73/721; 73/727; 73/DIG. 4; 338/3; 338/4; 338/42
[58] Field of Search ......................... 29/25.35, 610 SG; 73/708, 721, 727, DIG. 4; 338/3, 4, 42

[56] References Cited

U.S. PATENT DOCUMENTS

| | | | |
|---|---|---|---|
| 4,300,395 | 11/1981 | Shirouzu et al. | 73/708 |
| 4,333,349 | 6/1982 | Mallon et al. | 73/708 |
| 4,462,018 | 7/1984 | Yang et al. | 338/3 |
| 4,622,856 | 11/1986 | Binder et al. | 73/DIG. 4 X |

OTHER PUBLICATIONS

Vaganov, V. I. et al., Measuring Technique (USA), vol. 23, No. 5, pp. 405–408; May 1980.
Allan, Roger; "Sensors In Silicon", High Technology, pp. 43–50, Sep. 1984.

*Primary Examiner*—Carl E. Hall
*Attorney, Agent, or Firm*—Harry M. Weiss & Associates

[57] ABSTRACT

A pressure sensing device including a single crystal of silicon configured to have a diaphram portion, a frame portion and associated circuitry formed on the crystal is described. Piezo-resistive elements on the boundary of the frame and the diaphram portions of the crystal respond to changes in pressure. The piezo-resistive elements, associated elements, and connecting conducting paths are formed by thin film and/or doping techniques to provide a monolithically integrated circuit. The elements are passive and require only application of input voltages and detection of output signals to provide an operative component. Trimmable resistors are provided for compensation and resistive adjustment, and at least one resistive element provides temperature compensation.

8 Claims, 1 Drawing Sheet

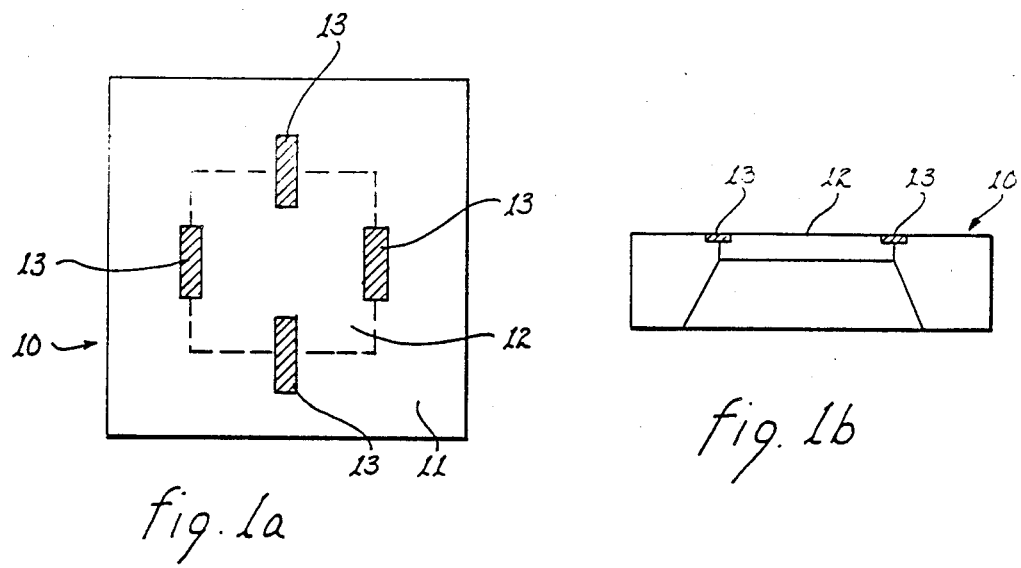
fig. 1a
fig. 1b
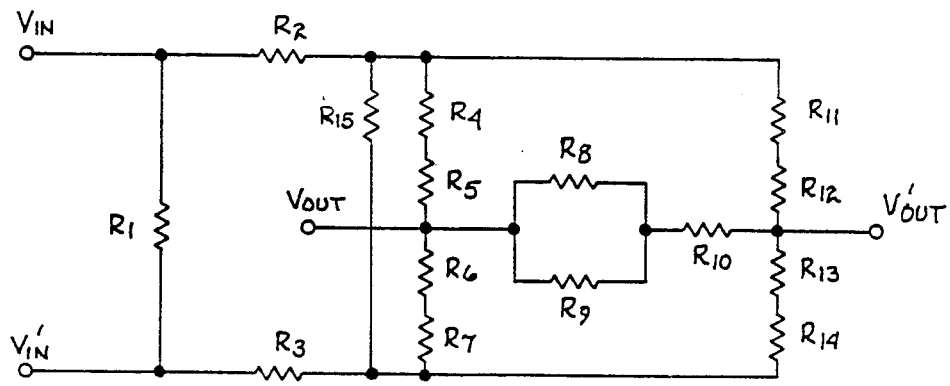
fig. 2
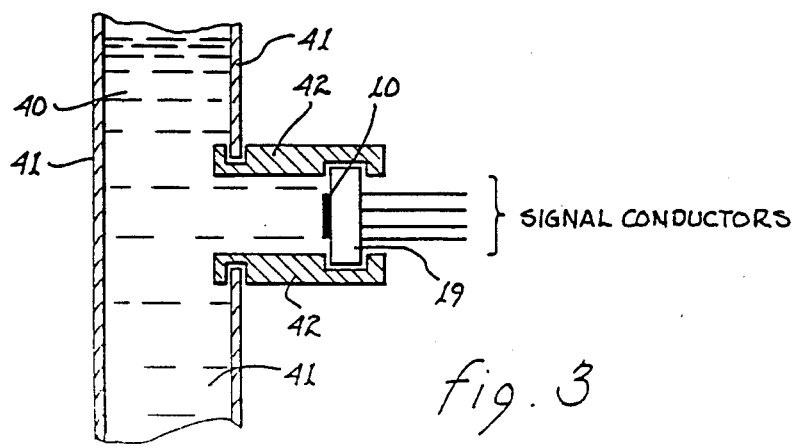
fig. 3

METHOD FOR FABRICATING A COMPENSATED SILICON PRESSURE SENSING DEVICE

This application is a division of application Ser. No. 666,372, filed Oct. 30, 1984, now U.S. Pat. No. 4,672,853.

BACKGROUND OF THE INVENTION

1. Field of the Invention

This invention relates generally to pressure sensing devices and, more particularly to devices for sensing pressure that are comprised of passive integrated circuit elements fabricated on a single crystal.

2. Discussion of the Related Art

It is known in the related art that deformation of an integrated circuit type of resistive element can cause a change in the value of the resistance, generally referred to as a piezo-resistive effect. Typically resistive elements are formed on deformable sections of a material and the variations in the resistance can be used to determine the force applied to the material.

These devices, as implemented in the past, have several disadvantages that have limited their usefulness. In particular, although the piezo-resistive elements are formed on the deformable material, the associated elements are typically comprised of discrete components and are located in a separate circuit area. To increase sensitivity and accuracy, the piezo-resistive elements are typically components of a bridge circuit, requiring several associated circuit elements. The use of discrete elements is not an effective use of space. In addition, the resistive elements are temperature dependent and, for accurate pressure measurements, temperature compensation is required.

A need was therefore felt for a component that includes, not only the piezo-resistive elements, but the associated circuit elements as well. A further requirement for the component is the use of passive circuit elements and the inclusion of temperature compensation in the component.

SUMMARY OF THE INVENTION

It is therefore an object of the present invention to provide an improved pressure sensing device.

It is another object of the present invention to provide a precision monolithic pressure sensing device.

It is still another object of the present invention to provide a monolithic pressure sensing device comprised of passive elements.

It is yet another object of the present invention to provide a thin diaphragm pressure transducer fabricated from a single crystal of material.

It is yet another object of the present invention to provide ion implanted piezo-resistive elements along with temperature compensation on a thin diaphragm pressure transducer.

It is yet another object of the present invention to provide a thin diaphragm pressure transducer with piezo-resistive elements as pressure sensing elements.

It is a still further object of the present invention to provide a thin diaphragm pressure transducer containing the temperature compensating elements fabricated on the pressure transducer device.

The aforementioned and other objects are accomplished, according to the present invention, by a thin diaphragm pressure transducer in which components have been formed in a single crystal of silicon to produce piezo-resistive elements, resistive elements and temperature compensating elements. The element network on the single crystal of silicon is a bridge circuit and the elements of circuit are all passive elements, permitting application of either AC or DC signals. The device can be used to measure pressure in a fluid and particularly, the device can be located in an intravenous tube to monitor the blood pressure of the patient.

These and other features of the present invention will be understood upon reading of the following description along with the figures.

BRIEF DESCRIPTION OF THE DRAWINGS

FIG. 1a is a top view of the thin film diaphragm device showing the general location of the piezo-resistive elements.

FIG. 1b is a cross-section view of the thin film diagram device of FIG. 1a.

FIG. 2 is a circuit diagram of the elements of the instant invention formed on the thin film diaphragm device.

FIG. 3 is a cross-sectional view of the use of the device in sensing pressure in a fluid-filled container.

OPERATION OF THE PREFERRED EMBODIMENT

Detailed Description of the Figures

Referring now to FIG. 1a, the pressure transducer 10 of the present invention is shown. The pressure transducer consists of a single crystal of silicon, having a frame region 11 and a thin diaphragm region 12. Generally, at the intersection of the frame and the diaphragm, the piezo-resistive elements consisting of a diffusion by an appropriate material of the single crystal silicon are shown.

Referring now to FIG. 1b, a cross-section approximately in the middle of the pressure sensitive transducer 10 is shown. The diaphragm region 12 is shown as well as the doped regions 13 which exhibit the piezo-resistive effect.

Referring now to FIG. 2, the electrical circuit structure of the pressure sensitive transducer is shown. Two input terminals $V_{in}$ and $V'_{in}$ are present. $V_{in}$ is coupled to a first terminal of resistor $R_2$ and to a first terminal of resistor $R_1$. $V'_{in}$ is coupled to a second terminal of resistor $R_1$ and to a first terminal of resistor $R_3$. A second terminal of resistor $R_2$ is coupled to a first terminal of resistor $R_4$ and to a first terminal of resistor $R_{11}$; while a second terminal of resistor $R_3$ is coupled to a first terminal of resistor $R_7$ and to a first terminal of resistor $R_{14}$. A second terminal of resistor $R_4$ is coupled to a first terminal of resistor $R_5$, a second terminal of resistor $R_{11}$ is coupled to a first terminal of resistor $R_{12}$, a second terminal of resistor $R_7$ is coupled to a first terminal of resistor $R_6$, and a second terminal of resistor $R_{14}$ is coupled to a first terminal of resistor $R_{13}$. A $V_{out}$ terminal is coupled to a second terminal of resistor $R_5$, a second terminal of resistor $R_6$ terminal, a first terminal of resistor $R_8$, and to a first terminal of resistor $R_9$. A $V'_{out}$ terminal is coupled to a second terminal of resistor $R_{12}$, to a second terminal of resistor $R_{13}$, and through resistor $R_{10}$ to a second terminal of resistor $R_8$ and to a second terminal of resistor $R_9$. A resistor $R_{15}$, coupled between a second terminal of resistor $R_2$ and a second terminal of resistor $R_3$, is shown by dotted lines.

Referring now to FIG. 3, a tube 41 containing a fluid 40 is shown. An interface mechanism 42 is coupled to the walls of the tube 41 containing the fluid and to the pressure sensitive device 10. The fluid 40 is in contact with the pressure sensor transducer 10. The four leads that couple terminals $V_{in}$, $V'_{in}$, $V_{out}$ and $V'_{out}$ and labelled signal conductors in the figure are indicated as coupling directly to the pressure sensitive, elements. It will be clear that this is a schematic representation and an interface element can be necessary for electrical coupling of the pressure sensitive transducer 40 and the signal conductors.

Operation of the Preferred Embodiment

Referring once again to FIG. 1a and FIG. 1b, a thin diaphragm 12 and a frame 11 are constructed of a single crystal of silicon. In the region of the inter-section of the diaphragm portion 12 and the frame portion 11, a diffusion by a selected material is performed in the silicon that results in a resistor at each intersection of the diaphragm and the frame. These resistors 13 form the elements of a Wheatstone bridge and when pressure is applied to the diaphragm, a distortion of the dopedarea resistors produces a measurable piezo-resistive effect.

Referring now to FIG. 2, resistors $R_5$, $R_6$, $R_{12}$ and $R_{13}$ are the schematic representations of the Wheatstone bridge resistors implemented by the four diffused regions 13 for pressure sensitive device 10. The other resistors, $R_1$, $R_2$, $R_3$, $R_8$, and $R_{10}$, and the conducting paths are all formed on the silicon crystal by the deposition on the silicon single crystal appropriate materials. Resistor $R_9$ is formed by doping a region of the silicon single crystaal. Resistors $R_4$, $R_{11}$, $R_{14}$ and $R_7$ are placed in the circuit to permit an adjustment of the resistance in each of the branches. Thus, these resistors are trimmable type of resistors that permit a variation in the resistive value through, for example, the use of a laser to burn away part of the resistive element. These resistors are adjusted for a zero voltage between the $V_{out}$ and the $V'_{out}$ terminal. The resistors $R_8$ and $R_{10}$ are also trimmable resistors and are used to establish the output resistance of the network. Resistor $R_2$ and $R_3$ are trimmable resistors whose values can be chosen to set the circuit sensitivity. Resistor $R_1$ is a trimmable resistor whose value can be chosen to set the circuit input resistance.

A particularly critical resistance for this device is resistor $R_9$. As temperature is increased, the piezo-resistive effect of resistors $R_5$, $R_6$, $R_{12}$ and $R_{13}$ decreases. Resistor $R_9$ is chosen to have a positive temperature coefficient to compensate for the decrease in the piezo-resistive effect with temperature. The temperature coefficient of the resistor $R_9$ can be controlled by the dopant level. The temperature coefficient of resistance for silicon for a multiplicity of doping atoms is well-known in the literature. Similarly, resistor 15 can be a doped region resistor with a positive temperature coefficient either to replace resistor 9 or to assist resistor 9 in the compensation process.

The zero pressure offset of the bridge configuration is dependent on the match of temperature coefficient of resistance of the bridge resistors. The match of the temperature coefficient of resistance of the resistors is dependent on how well the dopant concentration among the bridge resistors is equalized. Using an ion implantation technique combined with low temperature coefficient of resistance thin film resistors for trimming resistances produces a weak dependence of the zero pressure offset with temperature.

The use of passive elements in the bridge circuit and in the compensation circuit allows either AC or DC voltage to be applied to the input terminals.

Referring again to FIG. 3, an application of the instant invention is shown. The pressure sensing transducer 10 is mounted so as to be in contact with the fluid 40. The signal conductors apply $V_{in}$ and $V'_{in}$ to the transducer and receive $V_{out}$ and $V'_{out}$ from the transducer. When the fluid column is associated with an intervenous device, the blood pressure can be monitored.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A method for fabricating a pressure transducer including a silicon piezo-resistive bridge circuit with a pair of input terminals and a pair of output terminals, comprising the steps of:
    providing a single crystal silicon substrate including a diaphragm region containing piezo-resistive silicon bridge elements;
    forming a first doped silicon resistive means having a positive temperature coefficient in said single crystal substrate;
    depositing low-temperature coefficient trimmable thin-film resistive elements over said silicon substrate;
    coupling said piezo-resistive silicon bridge elements and said trimmable thin-film resistive elements to form a bridge circuit having a silicon bridge element and trimmable thin-film resistive means in each arm; and
    serially coupling one of said trimmable thin-film resistive elements and said first doped silicon resistive means across said pair of output terminals of said bridge circuit.

2. The method according to claim 1, further comprising forming a second doped silicon resistive means having a positive temperature coefficient in said single crystal silicon substrate, and coupling said second doped silicon resistive means across said pair of input terminals of said bridge circuit.

3. The method according to claim 1, further including adjusting the values of said trimmable thin film resistive elements to balance said bridge and to determine the output impedance of said bridge.

4. The method according to claim 1, further including adjusting the values of said trimmable thin film resistive elements to balance said bridge and to determine the output impedance of said bridge.

5. The method of claim 1 further including the step of adjusting the sensitivity of said bridge circuit by trimming a thin-film resistor serially coupled with said pair of input terminals.

6. The method of claim 1 further including the step of forming a second resistive element across input terminals of said bridge circuit, said second resistive element having a temperature coefficient compensating for a temperature coefficient of said bridge.

7. A method for fabricating a monolithic pressure transducer including silicon piezo-resistors connected in a bridge circuit with a pair of input terminals and a pair of output terminals, comprising the steps of:

adjusting the balance of said bridge circuit by trimming thin-film resistors in series with said piezo-resistors; and providing doped silicon resistive means coupled across one of said pair of said input or said output terminals for compensating the decrease in piezo-resistive effect of said piezo-resistors with increasing temperature.

8. The method of claim 1, further comprising adjusting the terminal impedance of said pressure transducer by trimming a thin-film resistor coupled across one of said pair of input terminals or said pair of output terminals.

* * * * *